(12) United States Patent
Janssen

(10) Patent No.: US 6,862,395 B2
(45) Date of Patent: Mar. 1, 2005

(54) ATTENUATION DEVICES

(75) Inventor: Adrian P Janssen, Exeter (GB)

(73) Assignee: Nortel Networks Limited, St. Laurent (CA)

( * ) Notice: Subject to any disclaimer, the term of this patent is extended or adjusted under 35 U.S.C. 154(b) by 380 days.

(21) Appl. No.: 09/992,619

(22) Filed: Nov. 16, 2001

(65) Prior Publication Data
US 2003/0095777 A1 May 22, 2003

(51) Int. Cl.$^7$ ................................................ G02B 6/00
(52) U.S. Cl. ............................ 385/140; 385/24; 385/47
(58) Field of Search ............................. 385/16, 17, 18, 385/19, 24, 37, 39, 43, 46, 47, 140

(56) References Cited

U.S. PATENT DOCUMENTS

| | | | | |
|---|---|---|---|---|
| 5,335,114 A | * | 8/1994 | Suzuki | 359/602 |
| 5,943,155 A | * | 8/1999 | Goossen | 359/247 |
| 5,949,571 A | * | 9/1999 | Goossen et al. | 359/291 |
| 6,148,124 A | * | 11/2000 | Aksyuk et al. | 385/24 |
| 6,556,338 B2 | * | 4/2003 | Han et al. | 385/140 |
| 6,636,657 B1 | * | 10/2003 | Aksyuk et al. | 385/140 |

* cited by examiner

Primary Examiner—Michael P. Stafira
Assistant Examiner—Juan D Valentin, II
(74) Attorney, Agent, or Firm—Barnes & Thornburg LLP

(57) ABSTRACT

In one embodiment of the invention, an optical attenuation device has an input/output 6 on which a multiplexed optical input stream is received. A multiplexer/de-multiplexer (MUX/DEMUX) 2 separates the received stream into individual optical signals on individual channels and has an output/return path 12 from the MUX/DEMUX 2 for each of the channels. Reflector means 4 in each output/return path 12 reflects all or a proportion of the optical signal on the respective channel back along the output/return path 12 to the MUX/DEMUX 2. At the MUX/DEMUX, the optical signals are combined into a multiplexed stream which is output on the input/output 6. In an alternative embodiment, the device has first and second MUX/DEMUX 2, 20, an output path 12 from the first MUX/DEMUX 2, attenuation means 40 at the end of each output path 12 and return paths 120 from the attenuation means 40 to the second MUX/DEMUX 20. The attenuation means attenuates the optical signals on the respective channels, and the attenuated signals are combined into a multiplexed stream at the second MUX/DEMUX 20. Both embodiments achieve attenuation of multiplexed optical streams by attenuating the component optical signals of the stream in parallel.

21 Claims, 7 Drawing Sheets

ATTENUATION DEVICES

TECHNICAL FIELD

The invention relates to optical attenuation devices, in particular to such devices for attenuating the individual signals in a multiplexed optical stream. The invention also relates to methods of attenuating a multiplexed optical stream.

BACKGROUND TO THE INVENTION

In optical communications networks, optical signals are transported by optical fibres. Generally, these days, in order to maximise fibre utilisation, signals are transported as multiplexed streams, typically in dense wavelength division multiplexed format; the transport bandwidth of the fibre is divided into a number, typically forty, of evenly spaced wavelength or colour channels, and signals on each channel are combined into a multiplexed stream.

Optical signals in optical communications networks require amplification periodically to offset losses incurred in transportation. One method of amplification is with optical fibre amplifiers such as erbium doped fibre amplifiers (EDFAs). An EDFA may comprise a length of erbium doped active optical fibre; the input signal for amplification is transported along the active fibre that is also pumped with light which raises energy levels. The input signal stimulates downward transitions resulting in photons at the wavelength of the input signal, thereby amplifying it. Usually, a fibre amplifier will be located at a node in the network along with various other devices which may carry out required processes on incoming multiplexed streams.

A drawback associated with using fibre amplifiers for amplifying multiplexed streams is that fibre amplifiers tend to have a non-uniform gain profile; that is to say, gain may vary across the operable wavelength band of the amplifier. This equates to differences in amplification between the signals on successive channels in a multiplexed stream. In addition, changes in the gain profile may result from differences in power between the signals on successive channels. It is desirable to be able to tailor the gain profile to specific requirements rather than to have to make do with the gain profile of the fibre amplifier. In one specific instance, "flat gain" across the transport bandwidth is required.

There are various known methods of compensating for the non-uniform gain profile of EDFAs so as to effect a flat gain. For example, compensation may be achieved broadly across the profile by using static filters providing closely matching inverse attenuation which produce additive compensation with wavelength. However, power demands across a spectrum tend to vary, resulting in dynamic changes to the gain profile. In such circumstances, dynamic compensation is more appropriate. One dynamic compensation method involves using a small number of sequential Fourier filters, such as controlled Faraday rotators of the type disclosed in EP 634025 (Friskin et al). However, despite its dynamism, such a method does not allow each channel to be controlled individually. Moreover, optically sequential filters suffer from high optical loss for increasing channel resolution.

A device which enables the degree of attenuation on each channel within a spectrum to be continually varied, may be referred to as a dynamic gain flattening filter (DGFF). Such individual channel attenuation may be achieved by including a thermo optical attenuator on each of the output channels of a de-multiplexer and a static reflector at the de-multiplexed output plane, or the channels from the output plane may continue and be re-multiplexed. However, a DGFF with thermo optical attenuators requires a large number of heaters (one for each channel) and can lead to thermal effects on the de-multiplexer. Moreover, thermo optical attenuators have the downsides of polarisation dependence, high thermal load, high electrical dissipation.

OBJECT OF THE INVENTION

An object of the invention is to provide an attenuation device with the facility to dynamically attenuate each channel in a multiplexed optical stream. Moreover, it is an object to provide such a device with high resolution, low optical loss and simple construction.

BRIEF DESCRIPTION OF THE INVENTION

According to a first aspect, the invention provides an optical attenuation device comprising an input/output on which a multiplexed optical input stream is received, a multiplexer/de-multiplexer (MUX/DEMUX) for separating the received stream into individual optical signals on individual channels, an output/return path from the MUX/DEMUX for each of the channels, reflector means in each output/return path for reflecting all or a proportion of the optical signal on the respective channel back along the output/return path to the MUX/DEMUX, wherein the optical signals are re-combined by the MUX/DEMUX into a multiplexed stream which is output on the input/output.

At least one of the reflector means may be a MEMS actuated mirror. Each mirror may be displaced longitudinally, transversely or angularly thereby to control the proportion of individual optical signal reflected. An angularly displaced mirror is preferred because it is relatively insensitive to polarisation requirements and relatively small movements of the mirror are all that is needed to achieve the necessary attenuation of, say, 10–20 dB. The optical signal beams may be of the order of 10 $\mu$m in diameter, and movements of 100–200 $\mu$m may be needed to achieve the necessary attenuation. A transversely displaced mirror may be hampered by polarisation dependence. Preferably, MEMS actuated mirrors are electrostatically actuated, which involves low net electrical dissipation. MEMS actuated or any other mirrors may be fabricated using semi-conductor material substrates.

Alternatively, each reflector means may be a MARS-type device including two mirrors arranged generally parallel to one another thereby to define a cavity with the relative spacing of the mirrors variable so as to control the proportion of optical signal reflected according to interference effects.

Further alternatively, each reflector means may be a mirror in combination with a controllable, optically absorbing material; the material may be placed to the signal side of the mirror and controlled so as to limit the proportion of the signal getting to and from the mirror.

The MUX/DEMUX may be a planar waveguide device, which may be fabricated from semi-conductor material substrates.

Having input and output multiplexed streams using the same input/output requires some means of separating the two: the optical attenuation device may further comprise a circulator or an entity of an equivalent function which enables the output multiplexed stream to be diverted on to a different branch from the input multiplexed stream.

According to a second aspect, the invention provides an optical attenuation device for attenuating a multiplexed optical stream comprising means for attenuating each of the individual optical signals of the stream in parallel. Thus, unlike in the case of sequential or series processing of a signal, the loss associated with each channel is independent of the loss of any other channel.

According to a third aspect, the invention provides an optical attenuation device comprising an input on which a multiplexed optical input stream is received, a first MUX/DEMUX separating the received stream into individual optical signals on individual channels, an output path from the MUX/DEMUX for each of the channels, attenuator means in each output path attenuating the optical signal on the respective channel, a return path from the attenuator means for each of the channels, a second MUX/DEMUX at the ends of the return paths, and an output from the second MUX/DEMUX, wherein the attenuated optical signals are combined at the second MUX/DEMUX into a multiplexed stream which is output on the output.

The attenuator means may be a reflector means such that attenuation is achieved by reflecting all or a proportion of the optical signal on the respective channel. Any of the reflector means discussed with reference to the first aspect of the invention may be appropriate. On the other hand, the attenuator means may be a transmission means such that attenuation is achieved by transmitting all or a proportion of the optical signal on the respective channel. For example, the transmissions means may comprise a shutter, possibly a MEMS actuated shutter, which is controllably positioned so as to limit the proportion of the optical signal passing. Preferably, the shutter is so designed as to be polarisation independent.

The advantage of using first and second, separate MUX/DEMUX is that a circulator or device of similar function is not required, so there are no circulator insertion losses.

According to a fourth aspect, the invention provides a method of attenuating a multiplexed optical stream comprising de-multiplexing the stream thereby to separate the stream into individual optical signals, attenuating at least one of the signals by reflection and multiplexing the attenuated signals thereby to combine the signals into a multiplexed stream.

The attenuation of at least one of the signals may be achieved by reflecting all or a proportion of the signal or by transmitting all or a proportion of the signal.

According to a fifth aspect, the invention provides a method of attenuating a multiplexed optical stream comprising the de-multiplexing the stream thereby to separate the stream into individual optical signals attenuating each signal in parallel with the other signals and mutiplexing the attenuated signals thereby to combine the signals into a multiplexed optical stream.

Additionally, the invention provides reflector means for an optical attenuation device according to a first or third aspects of the invention.

Further, the invention provides MUX/DEMUX for an optical attenuation device according to a first, second or third aspects of the invention.

Also, the invention provides a node in an optical communications network incorporating at least one attenuation device according to a first, second or third aspects of the invention.

DESCRIPTION OF THE INVENTION

Figure 1:
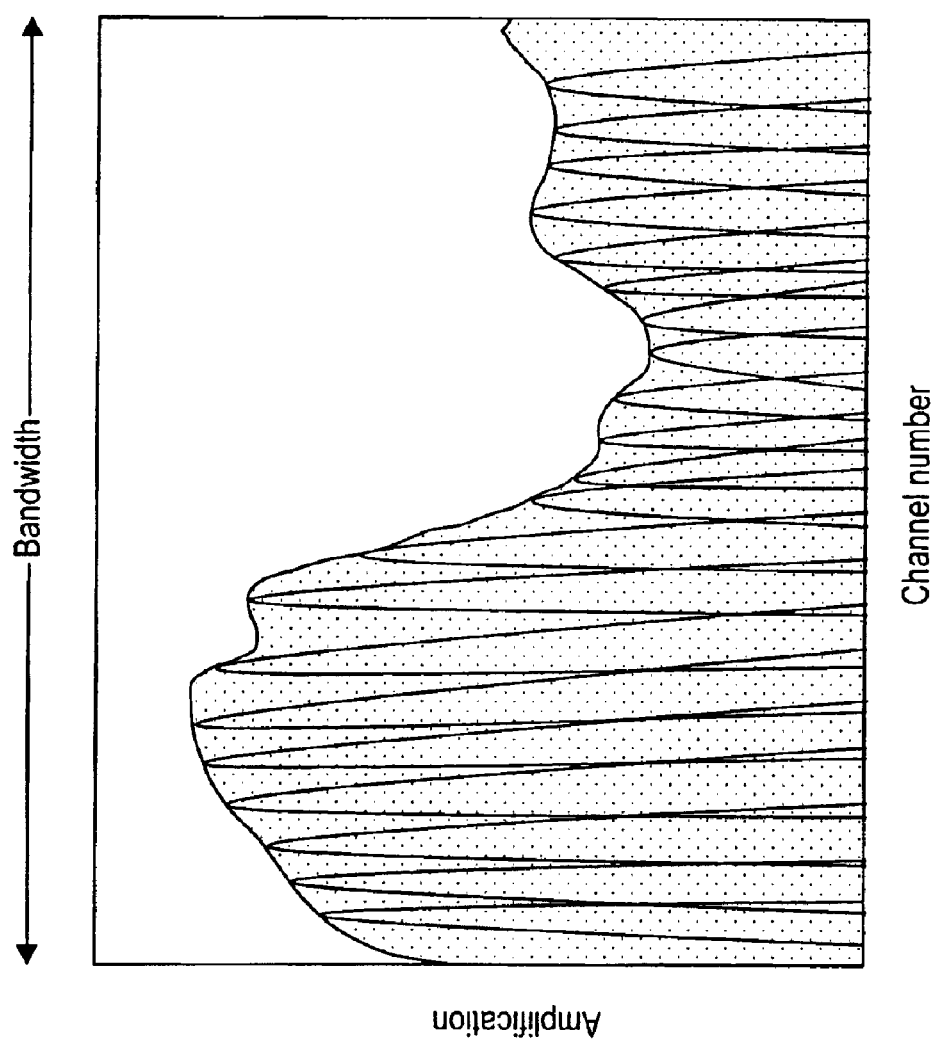
FIG. 1 is a graphical illustration of a typical gain profile characteristic of an amplified multiplexed optical signal stream.

With reference to FIG. 1, the transport bandwidth of an optical fibre (not shown) is divided into twenty-one individual, evenly spaced wavelength channels; on each channel there is an individual optical signal. The individual signals have been combined into a multiplexed optical stream. The multiplexed stream has been amplified at an Erbium doped fibre amplifier (EDFA) and, because of the non-uniform gain profile of the EDFA, the spectrum of the multiplexed stream has a non-uniform profile, with each of the channels amplified to a different extent. In order to compensate for this non-uniform characteristic, the multiplexed stream requires dynamic attenuation, that is, with each of the individual optical signals attenuated to a greater or lesser degree so as to effect a flat gain profile. Such dynamic attenuation is achieved by utilising an attenuation device according to the invention.

Figure 2:
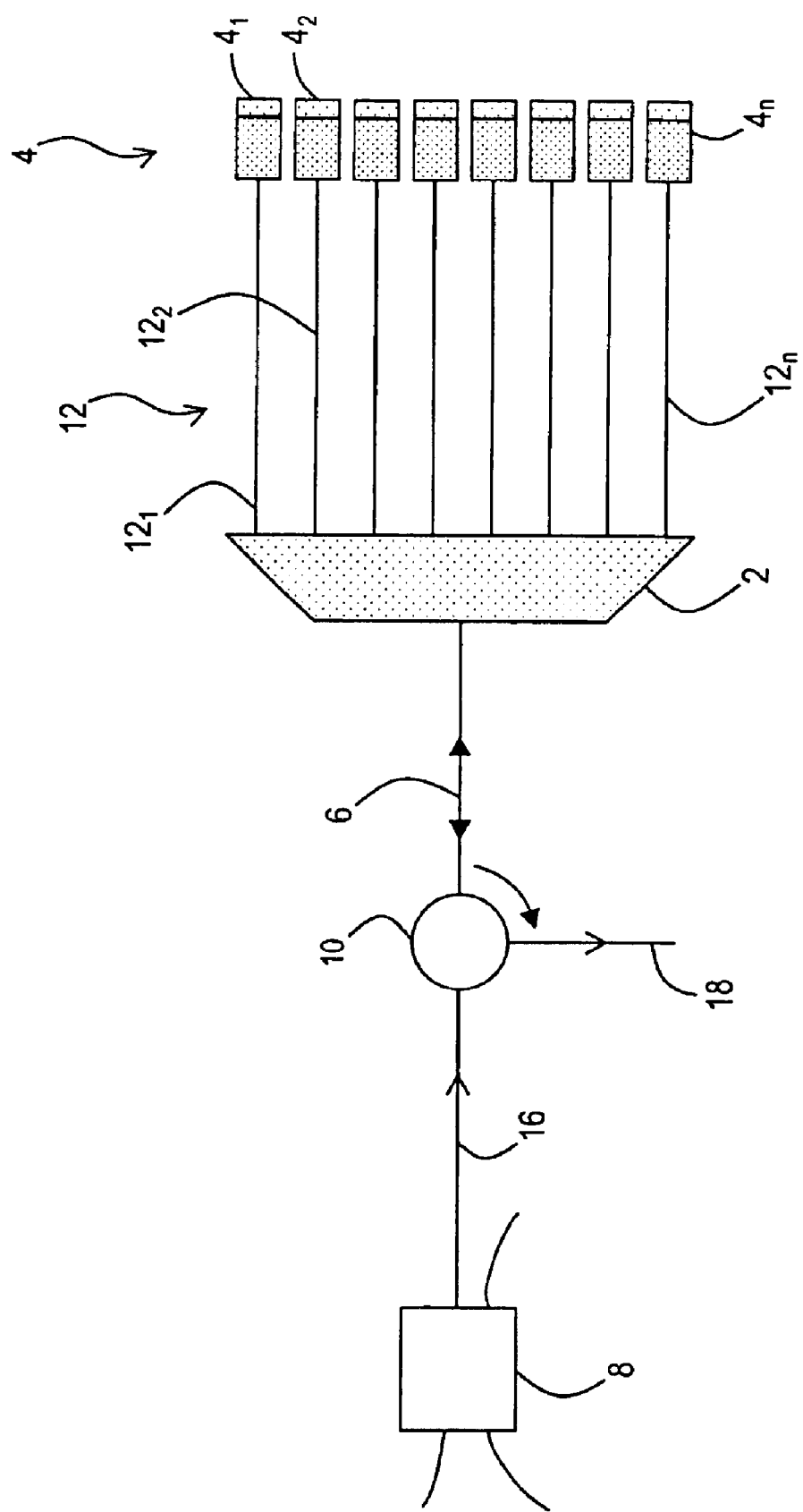
FIG. 2 is a schematic illustration of an attenuation device according to the invention.

With reference to FIG. 2, an attenuation device according to one aspect of the invention comprises a multiplexer/de-multiplexer (MUX/DEMUX) 2 and a dynamic mirror array 4 having n mirrors. The device is located at a node (not shown) in a optical communications network. A multiplexed optical stream is received on the input/output 6 to the MUX/DEMUX 2. The stream is received from an EDFA 8 via a circulator 10 on branch 16. The multiplexed stream is separated by the MUX/DEMUX 2 into its individual channels. Between the MUX/DEMUX 2 and the array 4 there is an output/return path 12 for each of the channels. Each path 12 terminates at one mirror $4_1, 4_2, \ldots 4_n$ in the mirror array 4. An individual signal arriving at the corresponding mirror $4_x$ along a path $12_x$ is reflected back along the path $12_x$ to the MUX/DEMUX 2. The proportion of signal which is reflected is controlled by varying the displacement of the mirror $4_x$. At the MUX/DEMUX 2, the reflected individual signals are re-combined to form an attenuated multiplexed optical stream which is output on the input/output 6 to the circulator 10 and out along branch 18. Hence, by controlling the degree of reflection and attenuation of each channel, the non-uniform effects of the EDFA 8 can be smoothed so that the output multiplexed stream has a flat gain profile.

As the input optical stream is demultiplexed into individual optical signals and as the individual signals are sent along individual output/return paths 12, which are parallel, the attenuation of a signal on one channel may occur simultaneously with the attenuation of one or more other signals on one or more other channels. In other words, the mirrors $4_x$ may operate in parallel and the individual signals may be attenuated in parallel.

Figure 3:
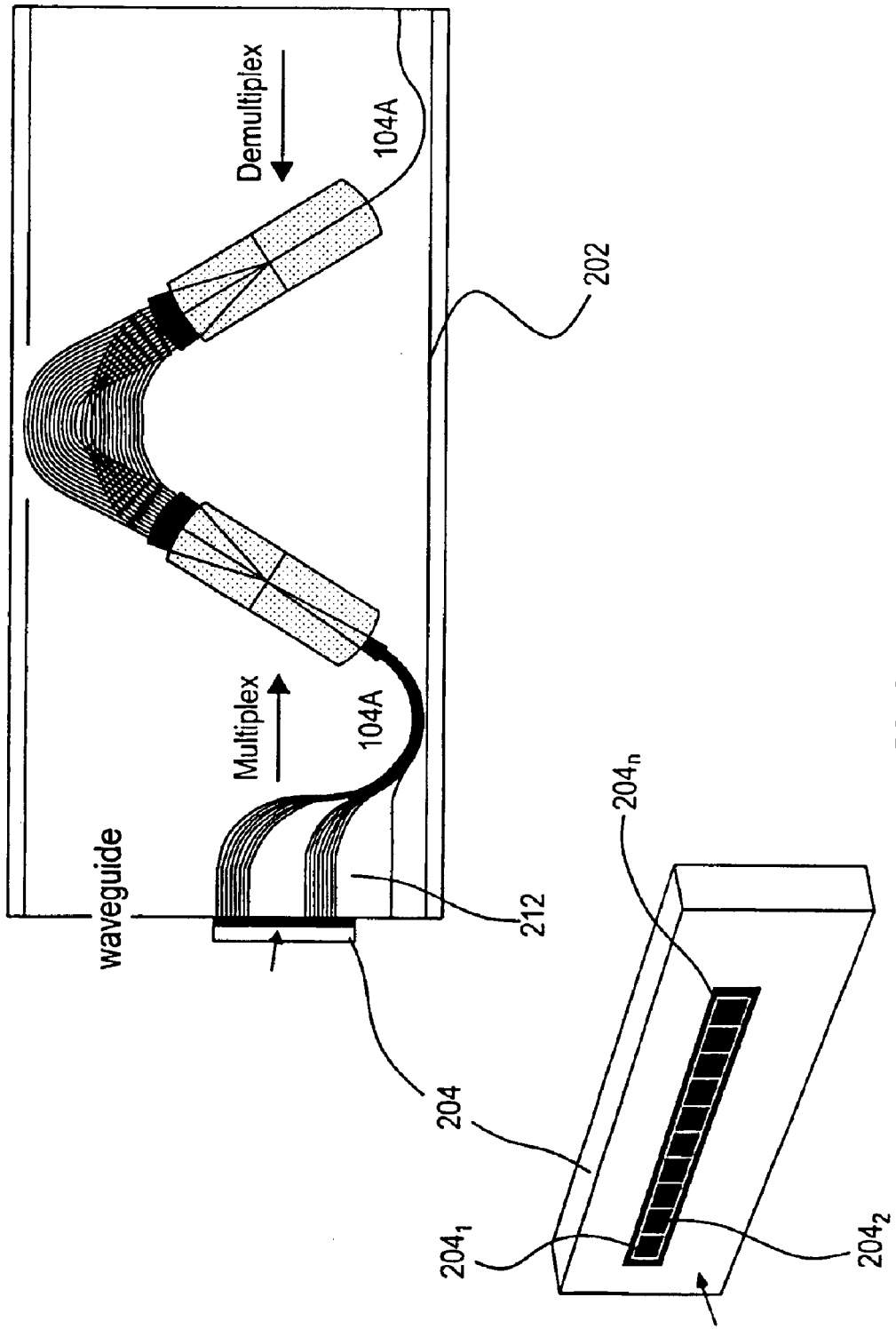
FIG. 3 is a schematic illustration of a specific embodiment of an attenuation device according to the invention.

With reference to FIG. 3, a specific embodiment of the invention uses a planar waveguide MUX/DEMUX 202 to separate an incoming multiplexed optical stream into individual optical signals. Planar waveguide multiplexer/de-multiplexers are well known, but briefly they achieve separation and recombination by utilising interference effect generated as a result of transporting signals along parallel, different length waveguide paths. The output/return paths 212 from the MUX/DEMUX 202 are also planar waveguides. Reflection back to the MUX/DEMUX is achieved by means of a MEMS mirror array 204 with a linear array of mirrors $204_1, 204_2 \ldots 204_n$ each individually electrostatically actuable. The planar waveguide MUX/DEMUX 202 is fabricated from semiconductor material substrates and joined to form hybrid working parts with the MEMS mirror array 204 located such that each mirror $204_x$ is aligned with one output/return path 212. Between the end of the output/return path 212 and the respective mirror $204_x$, the individual signal propagates as a free space beam of the order of 10 μm in diameter.

Figure 4:
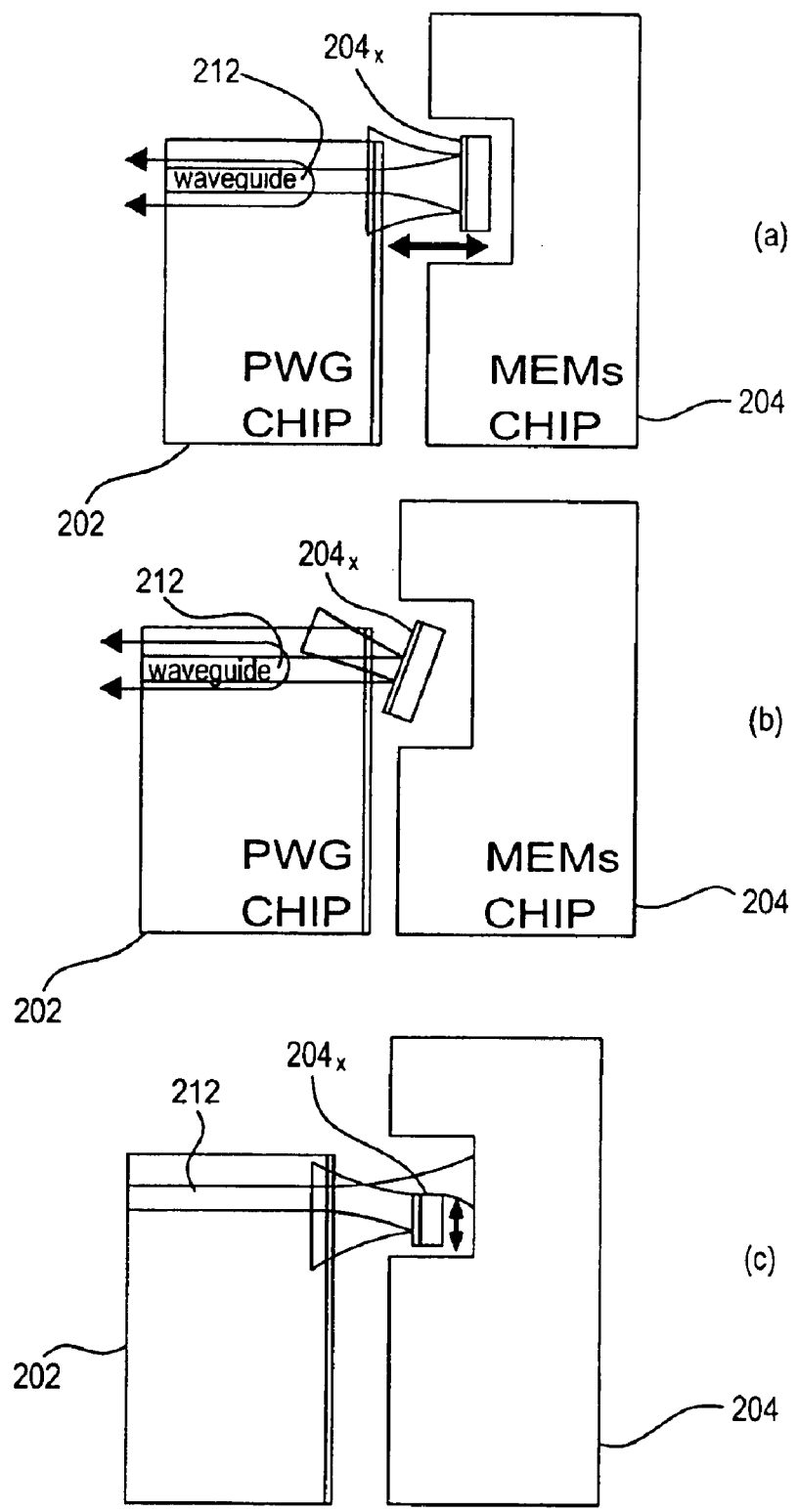
FIGS. 4a to 4c are schematic illustrations of mirror arrangements utilisable in the specific embodiments shown in FIG. 3.

With reference also to FIG. 4 (like parts to those shown in FIG. 3 having the same reference numerals), there a number of ways in which each mirror $204_x$ can be used to control a degree of reflection: either (a) the mirror $204_x$ can be moved longitudinally, that is, back and forth in relation to the axis of the output/return path 212 and, because the beam is a free space beam between the waveguide 212 and the mirror $204_x$, so as to utilise the inevitable dispersion of the beam on its path to and from the mirror $204_x$ such that only a proportion of the reflected signal is captured back in the waveguide 212; (b) the mirror $204_x$ may be pivoted so as to direct a proportion of the reflected beam "off axis" so that it is not captured by the waveguide 212; (c) the mirror $204_x$ may move transversely, that is, perpendicularly to the axis of the waveguide 212, so that only the proportion of the beam which is cut by the mirror $204_x$ is reflected back to the waveguide 212.

Figure 5:
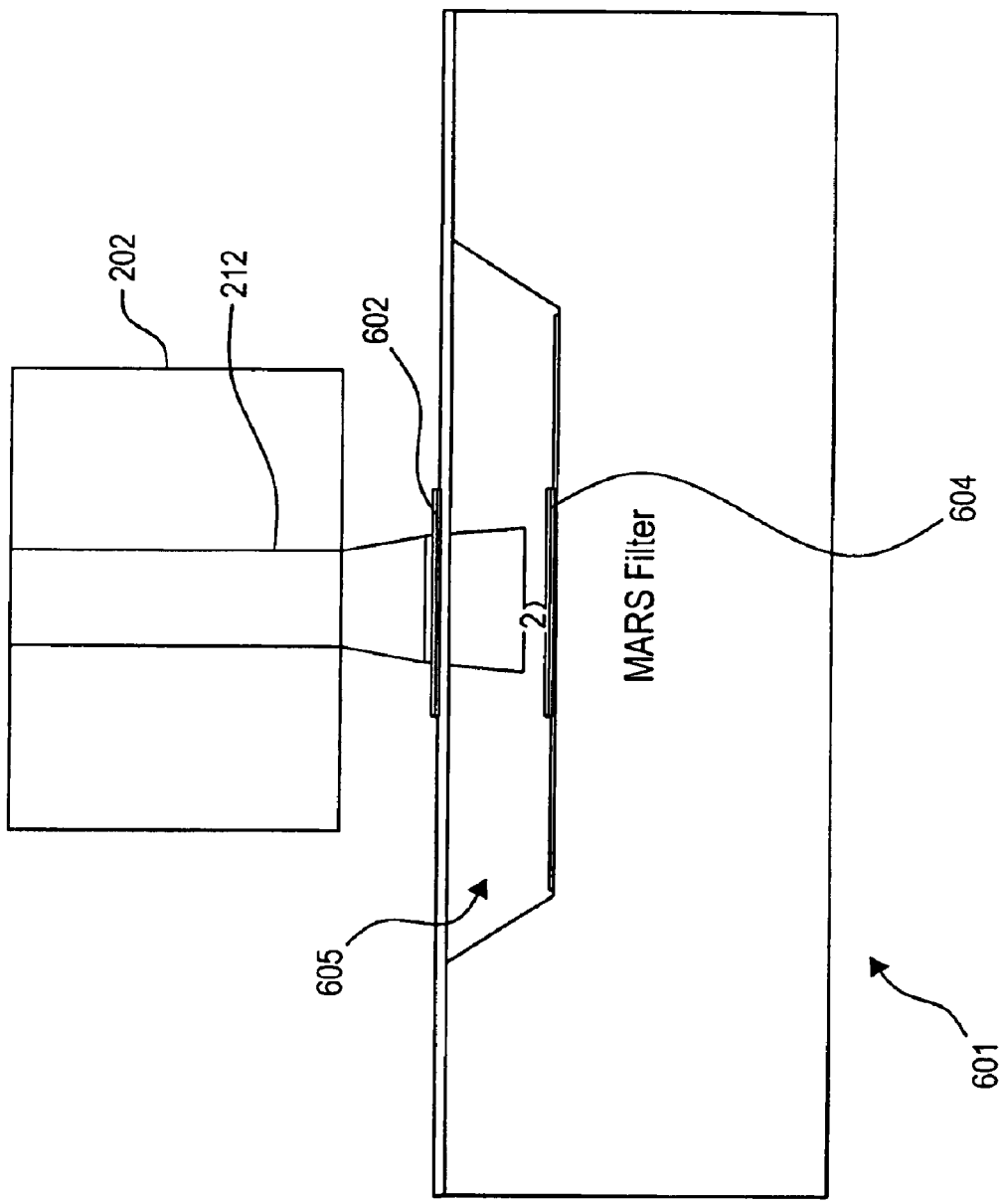
FIG. 5 is a schematic illustration of an alternative mirror device utilisable in an attenuation device according to the invention.

With reference to FIG. 5 (like parts to those shown in FIG. 3 having the same reference numerals), as an alternative to a MEMS mirror array, a so-called MARS-type mirror device, indicated generally at 601, may be utilised which has two co-axial but spaced apart partial mirrors 602, 604 defining a tunable mirror cavity 605 with the distance between the mirrors 602, 604 variable thereby to change the degree of reflection according to the resulting interference effects.

Figure 6:
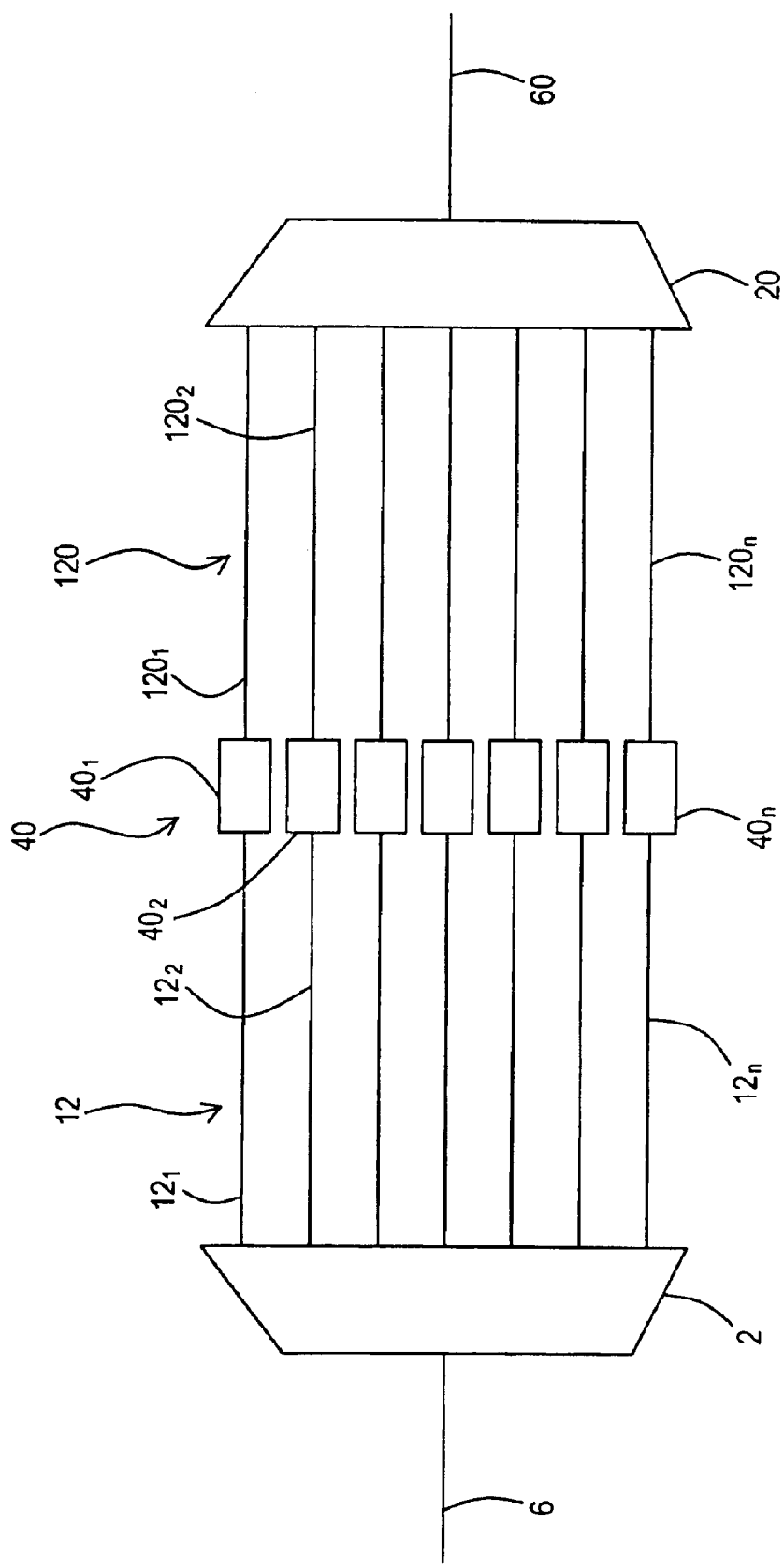
FIG. 6 is a schematic illustration of an alternative attenuation device according to the invention.

With reference to FIG. 6 an attenuation device according to another aspect of the invention comprises a first MUX/DEMUX 2, a dynamic shutter array 40 having n shutters and a second MUX/DEMUX 20. The device is located at a node (not shown) in an optical communications network. A multiplexed optical stream is received on the input/output 6 to the MUX/DEMUX 2. The multiplexed stream is separated by the MUX/DEMUX 2 into its individual channels. Between the first MUX/DEMUX 2 the array 40 there is an output path 12 for each of the channels. Each path 12 terminates at one shutter $40_1, 40_2 \ldots 40_n$ in the shutter array 40. Between the array 40 and the second MUX/DEMUX 20 there is a return path 120 for each of the channels. Each path 120 commences from one of the shutters $40_1, 40_2 \ldots 40_n$ in the shutter array 40. An individual signal arriving at the corresponding shutter $40_x$ along an output path $12_x$ is attenuated by the shutter and the attenuated signal passes along the output path $120_x$ to the second MUX/DEMUX 20. The degree of attenuation is controlled by the position of the shutter $40_x$. At the second MUX/DEMUX 20 attenuated individual signals are recombined to form an attenuated multiplexed optical stream which is output on an output 60.

Figure 7:
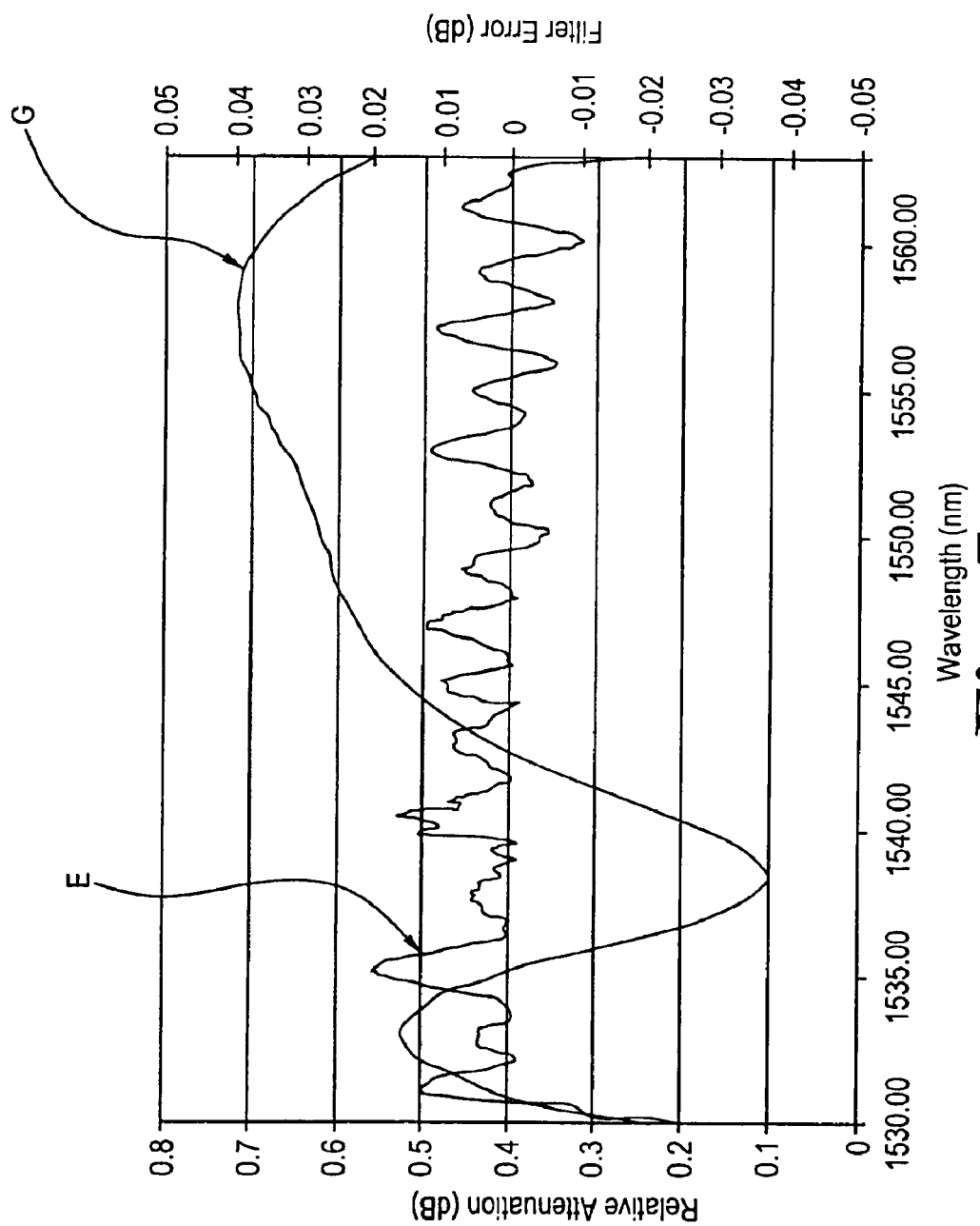
FIG. 7 is a graphical illustration of the performance of an attenuation device according to one aspect of the invention

With reference to FIG. 7, which shows graphically the performance of an attenuating device according to the invention, line G represents the non-linear gain profile of an EDFA operating in the so-called C band of wavelengths, with a wavelength channel spacing of 2 nm, and line E represents the profile following dynamic attenuation across all of the channels using the device described with reference to FIG. 2. As can be seen, by referring to the filter error scale to the right, flattening to within ±0.02 dB is achieved.

What is claimed is:

1. An optical attenuation device comprising a input/output on which a multiplexed optical input stream is received, a multiplexer/de-multiplexer (MUX/DEMUX) for separating the received stream into individual optical at signals on individual channels, an output/return path from the MUX/DEMUX for each of the channels, reflector means in each output/return path for reflecting all or a proportion of the optical signal on the respective channel back along the output/return path to the MUX/DEMUX and the optical signals are re-combined by the MUX/DEMUX into a multiplexed stream which is output on the input/output wherein at least one reflector means comprises a mirror in combination with a controllable, optically absorbing material.

2. An optical attenuation device according to claim 1 wherein at least one reflector means comprises a MEMS actuated mirror.

3. An optical attenuation device according to claim 2 wherein each mirror is displaced longitudinally, transversely or angularly thereby to control the proportion of individual optical signal reflected.

4. An optical attenuation device according to claim 2 wherein each mirror is electrostatically actuated.

5. An optical attenuation device according to claim 2 wherein each mirror is fabricated using semi-conductor material substrates.

6. An optical attenuation device according to claim 1 wherein at least one reflector means comprises a MARS-type device including two mirrors arranged generally parallel to one another thereby to define a cavity with the relative spacing of the mirrors variable so as to control the proportion of optical signal reflected according to interference effects.

7. An optical attenuation device according to claim 1 wherein the MUX/DEMUX is a planar waveguide device.

8. An optical attenuation device according to claim 1 wherein the MUX/DEMUX is fabricated from semi-conductor material substrates.

9. An optical attenuation device according to claim 1 further comprising a circulator or an entity of equivalent function which enables the output multiplexed stream to be diverted on to a different branch from the input multiplexed stream.

10. An optical communications network incorporating at least one optical attenuation device according to claim 1.

11. An optical attenuation device for attenuating a multiplexed optical stream comprising means for attenuating each of the individual optical signals of the stream in parallel wherein the means for attenuating comprises reflector means such that attenuation is achieved by reflecting all or a proportion of an optical signal on a respective channel and the reflector means comprises a mirror in combination with a controllable, optically absorbing material.

12. An optical communications network incorporating at least one optical attenuation device according to claim 11.

13. An optical attenuation device comprising an input on which a multiplexed optical input stream is received, a first MUX/DEMUX separating the received stream into individual optical signals on individual channels, an output path from the MUX/DEMUX for each of the channels, attenuator means in each output path for attenuating the optical signal on the respective channel, a return path from the attenuator means for each of the channels, a second MUX/DEMUX at the ends of the return paths, and an output from the second MUX/DEMUX wherein the attenuated optical signals are combined at the second MUX/DEMUX into a multiplexed stream which is output on the output wherein the attenuator means comprises reflector means such that attenuation is achieved by reflecting all or a proportion of the optical signal on the respective channel and the reflector means comprises a mirror in combination with a controllable, optically absorbing material.

14. An optical attenuation device according to claim 13 wherein the attenuator means comprises transmission means such that attenuation is achieved by transmitting all or a proportion of the optical signal on the respective channel.

15. An optical communications network incorporating at least one optical attenuation device according to claim 13.

16. A method of attenuating a multiplexed optical stream comprising de-multiplexing the stream thereby to separate the stream into individual optical signals, attenuating at least one of the signals by reflection using a mirror in combination with a controllable, optically absorbing material and multiplexing the attenuated signals thereby to combine the signals into a multiplexed stream.

17. A method of attenuating a multiplexed optical stream comprising de-multiplexing the stream thereby to separate the stream into individual optical signals, attenuating each signal in parallel with the other signals using reflection means comprising a mirror in combination with a controllable, optically absorbing material and multiplexing the attenuated signals thereby to combine the signals into a multiplexed stream.

18. Reflector means for an optical attenuation device comprising an input/output on which a multiplexed optical input stream is received, a multiplexer/de-multiplexer (MUX/DEMUX) for separating the received stream into individual optical signals on individual channels, an output/return path from the MUX/DEMUX for each of the channels, reflector means in each output/return path for reflecting all or a proportion of the optical signal on the respective channel back along the output/return path to the MUX/DEMUX and the optical signals are re-combined by the MUX/DEMUX into a multiplexed stream which is output on the input/output wherein at least one reflector means comprises a mirror in combination with a controllable, optically absorbing material.

19. Reflector means for an optical attenuation device comprising an input on which a multiplexed optical input stream is received, a first MUX/DEMUX separating the received stream into individual optical signals on individual channels, an output path from the MUX/DEMUX for each of the channels, attenuator means in each output path for attenuating the optical signal on the respective channel, a return path from the attenuator means for each of the channels, a second MUX/DEMUX at the ends of the return paths, and an output from the second MUX/DEMUX wherein the attenuated optical signals are combined at the second MUX/DEMUX into a multiplexed stream which is output on the output wherein the attenuator means comprises reflector means such that attenuation is achieved by reflecting all or a proportion of the optical signal on the respective channel and the reflector means comprises a mirror in combination with a controllable, optically absorbing material.

20. MUX/DEMUX for an optical attenuation device comprising an input/output on which a multiplexed optical input stream is received, a multiplexer/de-multiplexer (MUX/DEMUX) for separating the received stream into individual optical signals on individual channels, an output/return path from the MUX/DEMUX for each of the channels, reflector means in each output/return path for reflecting all or a proportion of the optical signal on the respective channel back along the output/return path to the MUX/DEMUX and the optical signals are re-combined by the MUX/DEMUX into a multiplexed stream which is output on the input/output wherein at least one reflector means comprises a mirror in combination with a controllable, optically absorbing material.

21. MUX/DEMUX for an optical attenuation device comprising an input on which a multiplexed optical input stream is received, a first MUX/DEMUX separating the received stream into individual optical signals on individual channels, an output path from the MUX/DEMUX for each of the channels, attenuator means in each output path for attenuating the optical signal on the respective channel, a return path from the attenuator means for each of the channels, a second MUX/DEMUX at the ends of the return paths, and an output from the second MUX/DEMUX wherein the attenuated optical signals are combined at the second MUX/DEMUX into a multiplexed stream which is output on the output wherein the attenuator means comprises reflector means such that attenuation is achieved by reflecting all or a proportion of the optical signal on the respective channel and the reflector means comprises a mirror in combination with a controllable, optically absorbing material.

* * * * *